May 29, 1945.  W. W. EATON  2,377,073
LATERAL AIRCRAFT GUN EMPLACEMENT
Filed Aug. 6, 1941   2 Sheets-Sheet 1
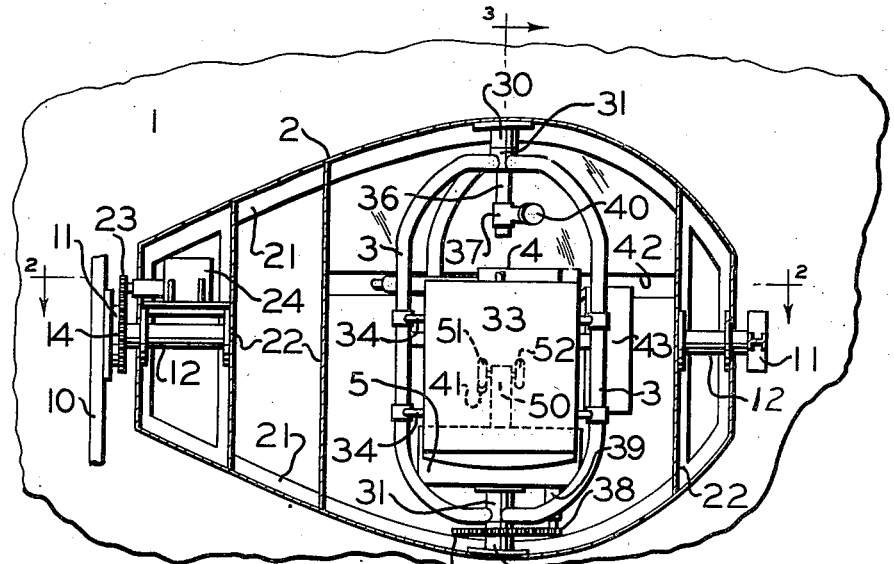
Fig. 1.
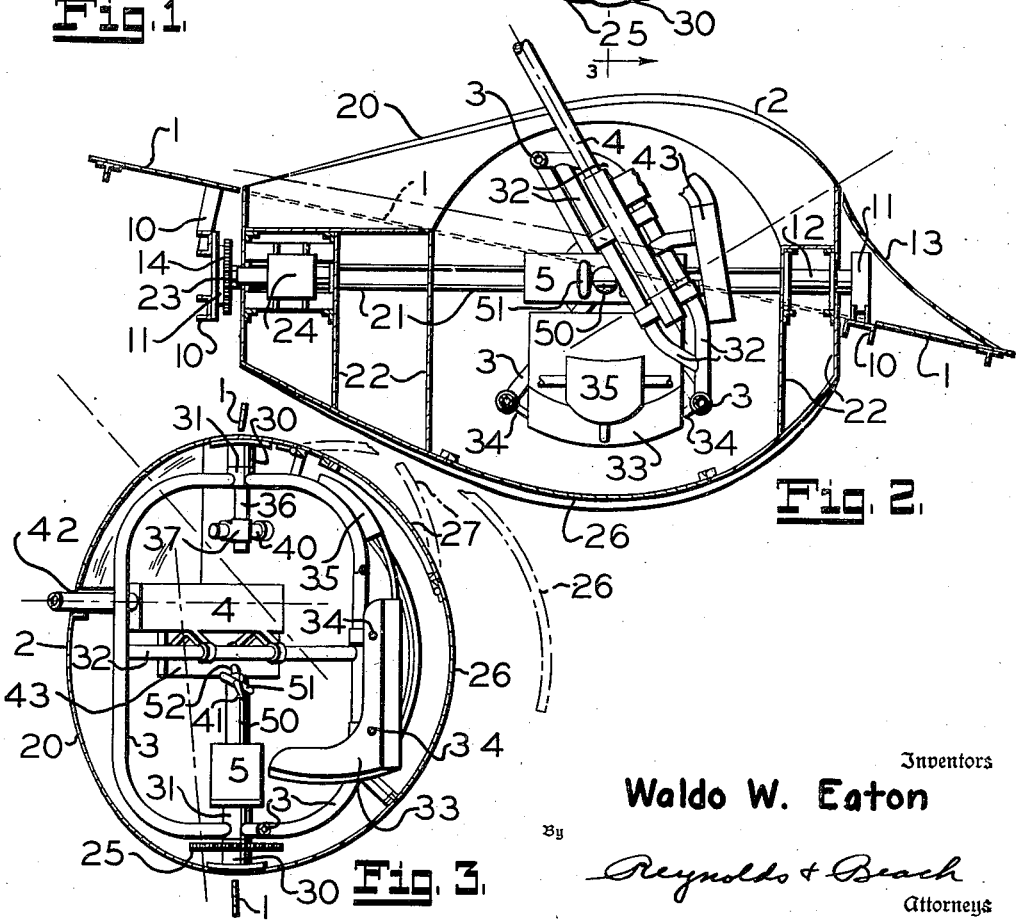
Fig. 2.
Fig. 3.
Inventors
Waldo W. Eaton
By Reynolds & Beach
Attorneys May 29, 1945.  W. W. EATON  2,377,073
LATERAL AIRCRAFT GUN EMPLACEMENT
Filed Aug. 6, 1941   2 Sheets-Sheet 2
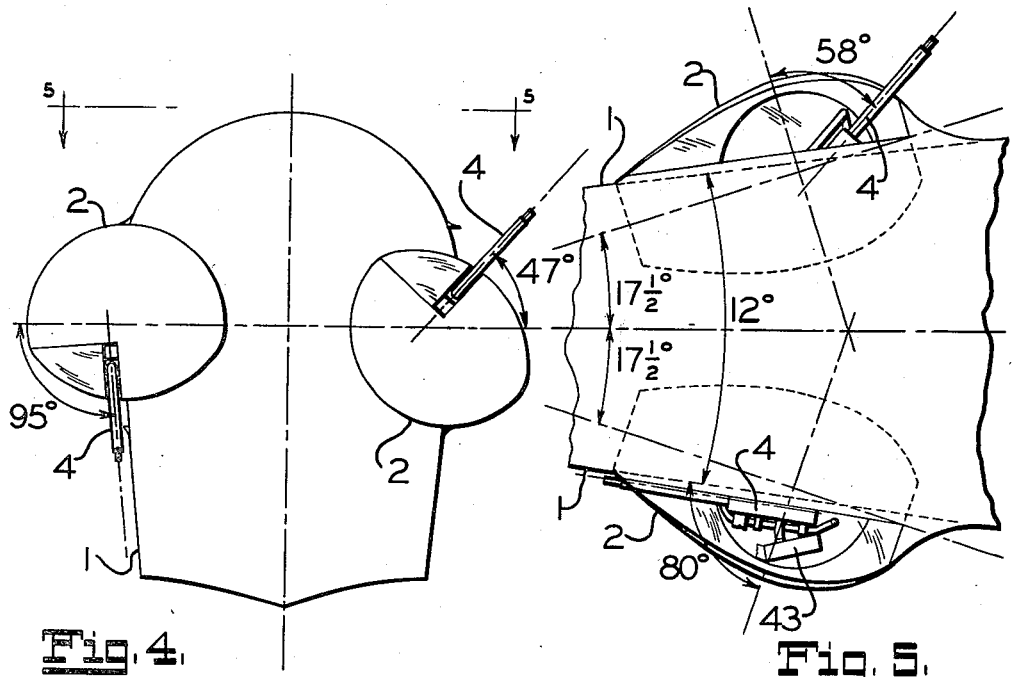
Fig. 4.   Fig. 5.
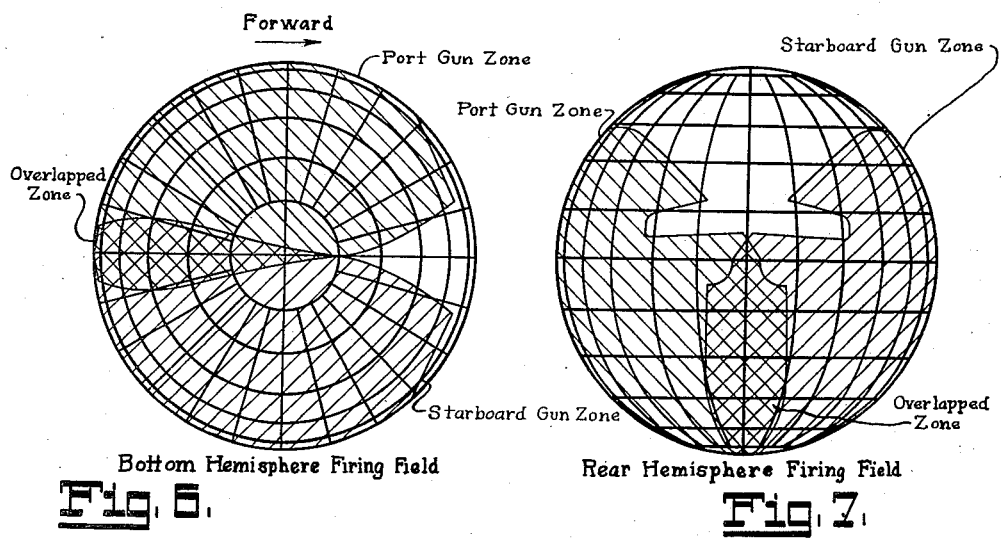
Bottom Hemisphere Firing Field
Fig. 6.
Rear Hemisphere Firing Field
Fig. 7.
Inventor
Waldo W. Eaton
By
Reynolds + Beach
Attorney Patented May 29, 1945

2,377,073

UNITED STATES PATENT OFFICE 2,377,073

LATERAL AIRCRAFT GUN EMPLACEMENT

Waldo W. Eaton, near Seattle, Wash., assignor to Boeing Aircraft Company, Seattle, Wash., a corporation of Washington Application August 6, 1941, Serial No. 405,662

17 Claims. (Cl. 89—37.5)

This invention relates to an improvement in blister gun mounts of the general type shown in Sanders Patent No. 2,233,642. The improvement is particularly concerned with increasing the field of fire for adaptation of such a blister gun mount to an aircraft of large size.

The blister gun mount for lateral disposition on an aircraft fuselage, disclosed in the above patent, was intended primarily to be used on relatively small aircraft. As the size of the airplanes increases, the spacing between lateral guns on opposite sides of the fuselage, of course, increases correspondingly, and it becomes progressively more difficult for the fields of fire of such guns to overlap rearwardly of and below the fuselage. Such gun emplacements must protrude as little as possible from the fuselage to minimize drag occasioned by them.

Moreover, the armament used in larger airplanes is heavier, and consequently less easily trained on the target by manual effort. Provision should therefore be made for effecting aiming movement of the guns by power-operated mechanism. Also, as larger guns are used and mounted to cover a more extensive field of fire, greater change in the gunner's position would normally be required during aiming of the gun in moving it from one extreme position to the opposite one. The problem is further complicated by the greatly increased speeds which such airplanes are now capable of achieving, requiring a higher degree of gun mobility so that it may be brought to bear upon the target before it has passed out of the field of fire or beyond effective range.

This invention is directed to the solution of the involved problem of armament installation presented by such evolution of airplane design. Generally this invention consists of an enlarged, laterally disposed blister enclosure, which is capable of housing not only the rear portion of a gun or guns, but also the gunner himself, the seat on which he sits, and probably sufficient ammunition for a protracted engagement, and the empty cases and links. Such a gun enclosure can be rotated by power about a generally longitudinal axis to elevate or depress the gun mechanism, which mechanism may also be housed within the enclosure, and further the gun itself may be traversed relative to the enclosure about a transverse axis, by similar power mechanism. The gunner's seat within the enclosure will, of course, be movable with the enclosure, and preferably is fixed relative to the gun, so that they will move conjointly with respect to the enclosure during traversing aiming movement of the gun.

In prior installations, such as that of the Sanders patent referred to, the blister was arranged to rotate about an axis generally coinciding with the supporting skin, but in order to enable the gun to be aimed throughout a firing field of the necessary rearward extent, its blister enclosure is mounted, according to this invention for rotation about an axis extending generally lengthwise of the aircraft, such as an airplane fuselage, but disposed at an angle to its longitudinal axis considerably greater than the angular relationship between such longitudinal axis and the local skin contour immediately fore and aft of the blister enclosure. The gun within the enclosure may thus be trained rearwardly substantially parallel to the skin, in order that its fire may substantially intersect the field of fire of the opposite gun, without interfering with the pivotal mechanism supporting the blister enclosure for rotation. Additionally the gun itself is mounted eccentrically of its transverse pivot axis, being offset forwardly from it, so that when it is swung rearwardly about such axis the center line of the gun, coinciding with its line of fire, will swing outwardly of such transverse pivot axis.

Especially in a flying boat type of aircraft, intersection of the fields of fire of opposite guns also beneath the airplane is desirable but is difficult to obtain because of the breadth of bottom desirable for flotation stability. To facilitate such aiming of the guns each is mounted eccentrically above the pivot axis of the blister enclosure. As it rotates to depress the gun, the latter will swing outwardly beyond the rotative enclosure axis. This upward offset is in addition to its forward offset from the traversing axis. Such dual eccentric disposition of the gun will enable the fields of fire to be extended sufficiently far in the critical direction to overlap, that is, at least parallel to, if not convergent toward the skin of the fuselage, even though the enclosure's pivot axis in the region of the gun mount, or the point of intersection of the two axes, is not located outwardly from the general local contour of the fuselage surface, and preferably is even somewhat inwardly of it.

Arrangement of the enclosure's pivot axis at an angle to the fuselage skin and principally inwardly of its surface contour enables the enclosure supporting mechanism to be housed more easily, and no heavy outboard construction is required. Furthermore such disposition improves the streamlined characteristics of the gun emplacement by reducing the outward protrusion of the enclosure. Such protrusion may be further reduced by making the normally outer side of the blister enclosure of generally elliptical, rather than circular, shape. Thus the radius of curvature would increase progressively from both top and bottom toward the central portion of such side, forming a curve faired into the top and bottom surfaces and lying a substantial distance inwardly from a circular extension of such top and bottom surfaces.

My principal object, therefore, is to provide a gun installation which will enable the maximum field of fire to be covered in a desired direction, such as rearwardly or downwardly, and substantially parallel to an aircraft surface, but which need not be supported by structure outboard of the fuselage, and which will be housed in an enclosure having a materially reduced outward projection for its size.

It is also my purpose to provide such mechanism which will be compact and relatively light in weight, but which will be extremely mobile, preferably being power-operated, and which the gunner can operate quickly and easily. Such operation is preferably accomplished by servo control mechanism which eliminates the necessity of the gunner handling the gun or moving it manually.

I wish particularly to provide such a system for guns projecting laterally from an airplane fuselage, which will afford maximum coverage in a rearwardly direction, or in a downwardly direction, or both rearwardly and downwardly as shown in the drawings. It will be evident, however, that the same principles are applicable to gun emplacements intended to cover principally a different zone or zones.

Figure 1 is a side elevation of a gun mount housed in a blister enclosure, looking from the inside of the fuselage outward, and with the near surface covering of the enclosure removed to show the interior mechanism. Figure 2 is a horizontal section taken along line 2—2 of Figure 1, while Figure 3 is a transverse vertical section taken along line 3—3 of Figure 1.

Figure 4 is a somewhat diagrammatic sectional view taken transversely of the airplane fuselage just aft of the gun emplacement, illustrating the lateral field of fire which may be covered by the opposite guns. Figure 5 is a somewhat diagrammatic, partial plan view taken on line 5—5 of Figure 4, showing the possible range of angular movement of the guns fore and aft.

Figure 6 is a diagram showing the spherical field of fire covered by the guns of Figure 4 beneath the airplane at a range of one hundred yards. Figure 7 is a similar diagram showing the spherical field of fire of the guns in Figure 5 in a rearward direction at a range of one hundred yards.

While my gun emplacement is intended primarily for use on large airplanes of the bombing type, it might, of course, be used on airplanes intended for other purposes, or even on lighter-than-air ships. Its function is to enable opposite guns to fire through overlapping fields when the body on which the guns are mounted tapers somewhat in the direction of such field overlap.

The local contour of the airplane fuselage skin 1, or the like, is interrupted, as shown in Figures 1, 2 and 3, to leave an aperture through which the rotatable, elongated blister enclosure housing the gun and gun mount may protrude, as shown in Figures 2 and 3. Within this blister enclosure is received the immediate supporting structure 3 for the gun 4. The blister enclosure is supported from the fuselage for rotation about a generally longitudinal axis, and generally parallel to the surface of the fuselage through which the blister and gun mount protrude, to effect elevational movement of the gun. The gun supporting frame 3 is swingable about a transverse axis to traverse the gun fore and aft, and the gun 4 may be fixed to the frame 3 to move with it, although, for some installations, additional movement of the gun with respect to this frame may be desired.

A typical installation is shown in Figures 4 and 5, in which the gun enclosures 2 are mounted upon the fuselage or hull of a flying boat 1. As shown in Figure 4 the lower portions of the hull side at the zone of the gun emplacement converge downwardly to the chine line at a total included angle of about 8 or 10 degrees, while at this same zone the sides converge rearwardly, as shown in Figure 5, at a total included angle of approximately 12 degrees. If, therefore, the gun supporting structure is set so as to enable the opposite guns to be trained in directions parallel to these surfaces, or even converging slightly toward them, their fields of fire will overlap. Any convergence of a line of fire towards the fuselage surface must be such that it will not intersect the contour of such surface short of the actual line of termination of the skin. Appropriate stops should be provided, where necessary, to limit movement of the gun supporting mechanism so that the line of fire can never intersect a portion of the aircraft, either by such convergence or by projection of the empennage into the field of fire, whatever operating position the control surfaces may assume.

The individual gun emplacement shown in Figures 1 to 3, inclusive, is carried by appropriate members, such as struts or bulkheads 10 fore and aft of the blister enclosure, which are incorporated into the fuselage structure adjacent the aperture through which the gun enclosure protrudes. These supporting members 10 carry the bearing housings 11 within which are provided suitable bearings, preferably of the antifriction type, in which are journalled trunnion tubes 12 rigidly secured to the blister enclosure. The tubes at front and rear of the enclosure are, of course, aligned and define the generally longitudinal axis about which the enclosure rotates.

One of the important features of my invention is the disposition of the enclosure's rotative axis with respect to the center line of the fuselage and to its skin, such that the gun may be trained substantially parallel to the fuselage skin without approaching coincidence, or even parallelism, with the enclosure's rotative axis. Assuming that such parallel line of fire is desired rearwardly, the bearing 11 for the front trunnion tube 12 will be set substantially in the skin line, or even slightly outwardly thereof, being covered by a suitable fixed streamlined fairing 13. The bearing 11 for the rear trunnion tube 12, however, will be located a substantial distance inwardly of the skin line, as shown in Figure 2. The rotative axis of the blister enclosure will thus be at a considerable angle to the longitudinal axis of the fuselage, such as 17½ degrees, or inclined 11½ degrees with respect to the fuselage surface, as indicated in Figure 5. Even though the front trunnion bearing may be located slightly outward from the skin contour, the rearward bearing should be placed considerably farther inward from the skin than the distance of the front bearing outward, so that the principal or major portion of the axis lies inwardly of the local fuselage surface contour.

Although the transverse pivot axis may be somewhat nearer the front bearing than the rear bearing, and intersects the longitudinal rotative axis, such point of intersection will be substantially in the local fuselage skin contour, or perhaps slightly inward therefrom, yet the protrusion of the blister enclosure through the skin aperture will not be excessive. In every instance the central point of such transverse axis should not be outwardly of the local fuselage surface contour. To limit still further this projection, the bulge of the normally outer side of the blister enclosure 20, as shown in Figures 2 and 3, may be reduced. Thus the half shell of the enclosure inwardly of the longitudinal plane passing through the pivot axis of frame 3 may be circular, while that on the outer side may be generally elliptical, such longitudinal plane coinciding substantially with the major axis of the elliptical side.

Suitable skeleton structural members, such as longerons 21 and transverse bulkheads 22, are incorporated in the construction of the enclosure 2 to give it the required rigidity to carry the load of the gun and gunner, transmitted to it through the supporting frame 3 and the bearings 30. In these bearings, which should be of antifriction construction, are journalled spindles 31 from which the tubes of frame 3, preferably three in number, branch, serving as a cage encompassing the gun and gunner. The central portions of these tubes are generally parallel to the rotative axis of the frame, their ends curving inward for connection substantially perpendicularly to the spindles 31. Between two of these frame members are secured transverse tubes 32, forming a cradle or bed constituting a mount for the gun. While the gun might be made movable with respect to the frame 3, we prefer that it be fixed thereto in definitely oriented position, to be described more fully hereafter. It may be desired, of course, to provide suitable shock absorbing mechanism between the tubes 32 and the gun 4 to cushion the recoil of the gun.

The gunner's seat 33 preferably is also carried by the frame 3, upon members 34 fixed between the two upright frame tubes normally adjacent to the inner side of the enclosure shell. As shown in Fig. 2 the seat directly faces the transverse axis defined by bearings 30, so that the gun mount tubes 32 lie generally alongside and athwart the gunner's seat. Above this seat may be supported a padded head rest 35 against which the gunner's head may be pressed, so that it will not strike the enclosure 2 upon movement of the frame 3 with respect to the enclosure, or during rapid rotation of the enclosure, or when the airplane lurches. Especially is such protection desirable during relative movement between the cage and enclosure.

A convenient method for supporting the sighting telescope 40 is by mounting it on a rod 36 by means of a suitable bracket 37, which rod coincides with the rotative axis of the cage 3. The bracket may be secured to the rod 36 by set screws or equivalent clamping means, so that it may be adjusted vertically as well as rotatively, to dispose it at a height most accommodating for the gunner's eye and normally parallel to the bore of the gun 4.

As has been described, the gunner's seat, the gun, and the sighting telescope are all preferably fixed definitely with relation to the frame 3. The gun is aimed, therefore, by rotational movement of the blister enclosure 2 relative to the fuselage to elevate or depress it, and by rotation of the frame 3 relative to such enclosure to traverse it. Since the gunner's seat is carried by this frame he can not move the frame or gun manually, and consequently power mechanism is provided to effect such rotation. Use of power mechanism also is preferred because of the rapidity with which the aiming movements must be accomplished to operate the gun effectively.

The power means may be associated directly with a blister enclosure pivot, and a pivot of frame 3, respectively. More room is available for incorporating drive mechanism with the rear enclosure pivot than with the front pivot, because of the location of the former well inward from the skin contour. The frame rotating mechanism may be incorporated more conveniently with its lower pivot structure. The particular type of enclosure drive mechanism employed is not important so long as it reacts between the rotatable enclosure and the fuselage structure by which the bearing mounting 11 is supported. Suitable mechanism may include a gear 14 fixed to the bearing housing concentric therewith, with which meshes a planet pinion 23, rotated by a motor 24 mounted upon and housed within the enclosure 2. A similar drive arrangement is provided for rotating the frame 3 within and with respect to the enclosure 2. Such drive may include a gear 25 concentric with and fixed to bearing 30. With this gear meshes a planet pinion 38 carried by the frame and driven by a motor 39 similar supported.

The motors which drive the enclosure and frame, respectively, for rotation may be air motors, hydraulic motors, or electric motors, but preferably are of the servo hydraulic type, operated by liquid supplied under pressure by an electric motor and hydraulic pumping unit 5. This unit may be located immediately in front of the seat 33, as shown in Figures 2 and 3, from which may project upwardly a post or column 50, carrying a gun elevating control handle 51 and a gun traversing control handle 52, movable to effect operation of motors 24 and 39, respectively. Such controls may effect operation of either motor separately or both together, and such operation may be in either direction and at the variable speed selected by the gunner. In addition, this post may carry a trigger or triggers 41 for firing the gun or guns 4. Electric wires, or an air or hydraulic line to supply power to the rotating drive units may be led into the blister enclosure through the rear pivot tube 12. In the particular drive arrangement described, the unit 5 would preferably include a reservoir for the hydraulic motor liquid, if necessary, so that only power wires for supplying energy to the primary drive electric motor would extend through the journal tube. Preferably this electric motor is of the constant speed type, and controls 51 and 52 would operate directly on the hydraulic system to vary the direction and speed of operation of hydraulic motors 24 and 39, respectively.

In a gun emplacement of the type illustrated, it is desired to train the gun downward at least parallel with the outer surface of the fuselage. Preferably, as shown in Figure 2, the longitudinal rotative axis of the enclosure intersects the transverse gun traversing axis, and such point of intersection is not disposed outwardly of the local skin contour, and should be inwardly thereof. These axes need not intersect each other, but, as previously stated, the major portion of the blister enclosure axis is inwardly of the local fuselage surface contour. As the enclosure is rotated in one direction the upper bearing 30, in conjunction with the lower bearing 30 defining the transverse axis about which frame 3 swings, will swing outward beyond the local fuselage contour, and as the enclosure is rotated in the opposite direction the lower bearing 30 will thus swing outward, but the portion of such axis centrally between such bearings is never outwardly of the local fuselage surface contour. In the rotative position of enclosure 2 in which such axis is generally parallel to the fuselage aperture, or to a plane tangent to the local fuselage contour, all of such transverse axis may be inwardly of the local fuselage contour despite its curvature, as shown in Figure 3. Almost invariably, therefore, when the transverse axis is in such parallel position, it will either intersect the rotative axis of the enclosure 2, or will lie inwardly of such enclosure axis. If the transverse axis in such parallel position were appreciably outwardly of the enclosure axis, either too much of the gun would be exposed to the air flow or the enclosure would protrude too far laterally from the fuselage.

With the transverse axis thus disposed relative to the blister enclosure axis, my installation nevertheless makes it possible to aim the gun in the desired downward and rearward directions by locating the gun with its center line above the longitudinal enclosure axis and forward of the transverse axis, when the gun is in normal, laterally projecting position, as shown in Figures 3 and 4. The supporting tubes 32 are secured to the frame 3 at a location to accomplish this result. During rotation of the enclosure 2, therefore, the gun 4 will always have a bodily eccentric elevational movement, the radius of such movement being equal to the distance the gun's center line or line of fire is spaced perpendicularly from the enclosure's rotative axis. In the installation illustrated I have found that such an offset of 6½ inches is sufficient for this purpose. Such eccentric elevational movement of the gun will, of course, occur in every position of gun traverse. While this relative disposition of the gun's axis and the enclosure axis obtains the desired coverage beneath the airplane, it decreases the range of the firing field upward. This is of little importance, however, for an upper gun installation may be provided to cover the upper zone of fire, while on a flying boat, for example, a gun emplacement could not be provided on the bottom of the fuselage, which supports the airplane in the water. Thus, as indicated in Figure 4, the gun 4 may swing downward from horizontal through an angle of 95 degrees, for example, whereas the possible angle of up-swing is 47 degrees.

As will be seen in Figure 2, the longitudinal axis of the gun also does not coincide with the transverse axis 31, about which the frame 3 rotates, but, when the gun is in laterally projecting position, is offset forwardly of such pivot. The gun, therefore, has not only an elevational eccentric movement about the enclosure axis, but also a traversing eccentric movement about the frame axis. When the longitudinal and transverse axes intersect, as shown, and the gun's line of fire is spaced 5 inches forwardly of the transverse axis, the gun will swing outward when aimed to the rear, to fire at least parallel to the skin 1 of the fuselage behind the gun emplacement, as shown in Figure 5. In such position the line of fire will not interfere with the rear enclosure pivot, because of the joint effect of the gun's offset forwardly and of the angular disposition of the enclosure's rotative axis relative to the skin and longitudinal axis of the fuselage, despite the intersecting disposition of the rotative axes. Of course, if two guns are used both would be thus displaced to the same side of the transverse axis, and the nearest to the axis would be spaced from it a distance of such order.

The forward angle of swing is restricted to some extent by such arrangement, as also shown in Figure 5, the rear angle of swing from a plane perpendicular to the axis of enclosure 2 being 80 degrees, while that forward is only 58 degrees. Again the limitation of the forward swing is less important than the advantage gained by the additional swing to the rear, because there will normally be a front gun emplacement to cover the forward field of fire, whereas rear gun emplacements are less desirable because of the additional weight of the fuselage structure required to support them. Such a forward offset of the gun from the transverse axis is additionally advantageous, because it relieves the central portion of the enclosure somewhat for occupation by the gunner, while enabling the rotative axis to be disposed about midway between the ends of the enclosure.

Figure 6 shows the firing fields of the opposite guns beneath the fuselage at a distance of one hundred yards from the emplacement, indicating their overlapped zone. Figure 7 similarly shows the manner in which the firing fields of the two guns overlap in a common zone one hundred yards rearwardly of the gun emplacement. The irregular line in the central portion of the diagram indicates the portions of the two firing fields blanked out by appropriate stops, so that the line of fire of either gun can not pass through any portion of the empennage.

When the gun is swung upward or downward by rotation of the enclosure 2, a space will be left between the generally elliptical side 20 of the enclosure and the adjacent edge of the aperture in the fuselage skin 1. This will be a temporary condition, however, and the opening thus formed will not be large except when the enclosure is in position corresponding to extreme upward or downward position of the gun, as shown in Figure 4. Such attitudes are quite transitory and the advantage gained in reduced air resistance by decreasing the protrusion of the outer side of the blister enclosure far outweighs any disadvantage caused by the occasional occurrence of such opening. Despite such generally elliptical shape of the outer side of the enclosure the projection of the gun barrel into the air stream is not excessive, because the transverse pivot axis is located well inwardly from such enclosure side, intersecting or even being disposed inwardly of the blister enclosure axis. In fact, when swung completely to the rear, the end of the gun barrel may even move entirely inside the enclosure to house it completely, although even in such position it need not become parallel to the enclosure's rotative axis because of the inclination of such axis to the fuselage skin and its longitudinal axis.

In traversing of the gun 4 its barrel moves along a slot 42 defining a chordal plane perpendicular to the transverse axis defined by spindles 31. In the portion of the upper outer quadrant of the enclosure 2 between this slot and substantially a longitudinal plane through pivots 31 may be provided a window, as shown in Figs. 1, 3, 4 and 5, through which the gunner may view the target. A door 26 is provided in the inner wall of the enclosure, preferably hinged along its upper edge. The normally upper portion of the door may include an emergency escape hatch 27 which is pivoted along its lower edge for use in case the enclosure rotating mechanism should fail when the gun is in the upwardly swung position shown at the right of Figure 4. Suitable locking mechanism may be provided to retain the enclosure with the gun in horizontal position when not in use, or during entrance of the gunner into the enclosure or exit from it. An ammunition container 43 may be located alongside the gun, or ammunition may be fed into the enclosure 2 through the forward trunnion tube 12.

What I claim as my invention is:

1. In an airplane fuselage, a gun mount, an elongated blister enclosure protruding laterally from a surface of the fuselage and housing said gun mount, means supporting said enclosure for rotation about an axis longitudinally thereof and generally lengthwise of the airplane fuselage, supporting means within said enclosure carrying said gun mount and pivoted for swinging about an axis disposed generally transversely of said enclosure and of the aircraft fuselage, and a gunner's support within and supported from said enclosure for movement with said gun mount about such longitudinal axis as said enclosure rotates thereon, to maintain said gunner's support in fixed relationship to said gun mount in all positions swung about such transverse axis.

2. In an airplane fuselage, a gun mount, an elongated blister enclosure protruding laterally from a surface of the fuselage and housing said gun mount, means supporting said enclosure for rotation about an axis longitudinally thereof and generally lengthwise of the airplane fuselage, a supporting frame within said enclosure carrying said gun mount and pivoted for swinging about an axis disposed generally transversely of said enclosure and of the aircraft fuselage, and a gunner's support carried by said supporting frame and swingable conjointly with said gun mount and relative to said enclosure by pivotal movement of said frame, to maintain said gunner's support in fixed relationship to said gun mount in all positions swung about such transverse axis.

3. In an airplane fuselage, a gun mount, an elongated blister enclosure protruding laterally from a surface of the fuselage and housing said gun mount, means supporting said enclosure for rotation about an axis longitudinally thereof and disposed at an acute angle to the center line of the airplane fuselage greater than the angle between such center line and the local portion of the fuselage surface from which the enclosure projects, a supporting frame within said enclosure carrying said gun mount and pivoted for swinging about an axis disposed generally transversely of said enclosure and of the aircraft fuselage, and a gunner's support carried by said supporting frame and swingable conjointly with said gun mount and relative to said enclosure by pivotal movement of said frame, to maintain said gunner's support in fixed relationship to said gun mount in all positions swung about such transverse axis.

4. In an airplane, a lateral gun mount supported upon the airplane's fuselage, pivot means extending generally transversely of the fuselage for disposition substantially in the surface thereof, and means supporting said gun mount from said pivot means offset from the axis thereof, for outward swinging of the gun mount orbitally about said pivot means, to aim a gun supported thereby alongside and substantially parallel to the fuselage skin.

5. In an aircraft structure, a gun mount, pivot means, means supporting said pivot means for rotation about an axis substantially in the surface of the aircraft structure but disposed at an angle to the pivot means axis, and means supporting said gun mount from said pivot means offset from the axis thereof, for outward swinging of said gun mount orbitally about said pivot means, to aim a gun supported thereby alongside the surface of the aircraft structure.

6. In an aircraft structure, a gun mount, an enclosure housing said gun mount and protruding beyond the surface of the aircraft structure, means supporting said enclosure for rotation about an axis disposed generally in the surface of the aircraft structure, and pivot means disposed transversely of said enclosure and supporting said gun mount offset from the axis of said transverse pivot means for orbital swinging about such axis to project the gun mount bodily outward beyond the surface of the aircraft structure but within said enclosure.

7. In an aircraft structure, a gun mount, an elongated enclosure protruding laterally from the surface of the aircraft structure and housing said gun mount, means supporting said enclosure for rotation about an axis disposed generally longitudinally of said enclosure and aircraft structure, pivot means supported from said enclosure, and means supporting said gun mount from said pivot means offset from the axis thereof for disposition of a gun carried by said gun mount with its line of fire spaced forwardly of said transverse axis.

8. In an aircraft structure, a gun mount, an elongated enclosure protruding laterally from the surface of the aircraft structure and housing said gun mount, means supporting said enclosure for rotation about an axis disposed generally longitudinally of said enclosure and aircraft structure, pivot means supported from said enclosure and defining an axis substantially intersecting the axis of rotation of said enclosure, and means supporting said gun mount from said pivot means offset from both such transverse and longitudinal axes, for outward swinging of said gun mount orbitally about both such axes separately or conjointly.

9. In an aircraft structure, a gun mount, an elongated enclosure protruding laterally from the surface of the aircraft structure and housing said gun mount, means supporting said enclosure for rotation about an axis generally longitudinally of said enclosure and aircraft structure axis, directed rearwardly and inwardly from the aircraft structure surface, a frame pivoted upon said enclosure to turn about an axis substantially intersecting the axis of rotation of said enclosure, and means supporting said gun mount from said frame offset from both such transverse and longitudinal axes, for positioning a gun carried by said gun mount with its line of fire spaced forward of the transverse axis, and spaced above the longitudinal axis of the enclosure.

10. In an aircraft structure, a gun mount, an elongated enclosure protruding laterally from the surface of the aircraft structure and housing said gun mount, means supporting said enclosure for rotation about an axis generally longitudinally of said enclosure and aircraft structure, a frame pivoted upon said enclosure to turn about an axis substantially intersecting the axis of rotation of said enclosure, means supporting said gun mount from said frame offset from both such transverse and longitudinal axes, for positioning a gun carried by said gun mount with its line of fire spaced forward of the transverse axis and spaced above the longitudinal axis of the enclosure, and a gunner's seat mounted upon said frame for conjoint swinging with said gun mount about both such axes and with respect to said enclosure and aircraft structure.

11. The combination of claim 10, wherein the gunner's seat directly faces the pivot axis of the frame, and the gun mount is disposed generally alongside and athwart the gunner's seat in fixed relationship thereto in all positions of said gun mount swung about such pivot axis of the frame.

12. In an aircraft, a gun mount, pivot means mounted to dispose their axis substantially in the surface of the aircraft and generally parallel to its longitudinal axis, and means supporting said gun mount from said pivot means and offset above the axis thereof for orbital swinging about such axis to project bodily outward relative to the aircraft a gun carried by said gun mount to depress the gun downward alongside the outer surface of the aircraft.

13. In an aircraft structure, a gun mount for supporting a gun projecting through a surface of the aircraft structure, rotative means supported from the aircraft structure for rotation about an axis generally parallel to such surface of the aircraft structure, pivot means supported from said rotative means and defining an axis substantially perpendicular to and intersecting the axis of said rotative means at a point inwardly of such surface of the aircraft structure, and means supporting said gun mount from said pivot means offset from the axis thereof, for outward swinging of the gun mount orbitally about said pivot means axis to aim a gun supported thereby alongside the aircraft structure.

14. In an aircraft structure, a gun mount for supporting a gun projecting through a surface of the aircraft structure, pivot means for said gun mount, means supporting said gun mount from said pivot means offset from the axis thereof for orbital swinging of said gun mount, and rotative means supporting said pivot means for rotation about an axis generally parallel to such surface of the aircraft, at an angle to the axis of said pivot means and offset from said gun mount, for swinging of said gun mount orbitally about the axis of said rotative means as said pivot means rotates thereon.

15. In an airplane, a gun mount, rotative means disposed generally transversely of the airplane's fuselage, rotative means disposed generally longitudinally of the airplane's fuselage, and means supporting said gun mount from said two rotative means, offset forwardly from the axis of said first rotative means for orbital swinging outward and rearward, and offset above the axis of said second rotative means for orbital swinging outward and downward.

16. In an airplane, a gun mount, pivot means disposed in a plane generally transversely of the airplane's fuselage, means supporting said gun mount offset forwardly from the axis of said pivot means for orbital swinging of said gun mount outward and rearward, and rotative means supporting said pivot means for rotation about an axis generally longitudinal of the airplane fuselage and offset below said gun mount, for swinging of said gun mount orbitally outward and downward about the axis of said rotative means as said pivot means rotates thereon.

17. In an aircraft structure, a gun mount for supporting a gun projecting through a surface of the aircraft structure, pivot means for said gun mount, means supporting said pivot means to dispose the axis thereof substantially in the surface of the aircraft structure, and means supporting said gun mount from said pivot means offset from the axis thereof, for outward swinging of the gun mount orbitally about said pivot means axis to aim a gun supported thereby alongside the aircraft structure.

WALDO W. EATON.